United States Patent [19]

Johannes et al.

[11] 4,442,244

[45] Apr. 10, 1984

[54] PROCESS FOR PREPARING HEAT-CURABLE, WATER-DILUTABLE COATING COMPOSITIONS FOR COATING METAL SUBSTRATES

[75] Inventors: Gerhard Johannes, Taunusstein; Fali Shroff, Wiesbaden; Gerhard Dullis, Taunusstein; Dieter Steidl, Hofheim am Taunus, all of Fed. Rep. of Germany

[73] Assignee: Hoechst Aktiengesellschaft, Fed. Rep. of Germany

[21] Appl. No.: 276,702

[22] Filed: Jun. 23, 1981

[30] Foreign Application Priority Data

Jun. 27, 1980 [DE] Fed. Rep. of Germany ....... 3024158

[51] Int. Cl.$^3$ ............................................... C08L 0/00
[52] U.S. Cl. .................................... 523/221; 523/402; 523/403; 523/413; 523/414; 523/415
[58] Field of Search ............... 523/221, 402, 413, 414, 523/403, 415; 204/181 R

[56] References Cited

U.S. PATENT DOCUMENTS 3,869,366 3/1975 Suzuki et al. ...................... 204/181

*Primary Examiner*—Joseph L. Schofer
*Assistant Examiner*—J. M. Reddick
*Attorney, Agent, or Firm*—Bierman, Bierman & Peroff

[57] ABSTRACT

The invention relates to a process for preparing compositions for coating metal substrates or work pieces in an aqueous bath, in which the substrate forms the cathode.

In this process 5–35% by weight of at least one epoxy resin, 2–20% by weight of at least one ketone and/or hydrocarbon resin, 15–60% by weight of at least one cationic synthetic resin having functional groups—this compound is a 10–50% by weight dispersion or solution—, 5–30% by weight of at least one organic crosslinking agent, which is solid at ambient temperature and 0–73% by weight of pigments and/or conventional adjuvants are processed together in one or more stages in a grinding apparatus to form a homogeneous coating composition. At least one stage being a wet operation. The composition has a particle size of less than 100 μm, preferably less than 15 μm. The grinding bath is adjusted with water to the solids content required for application. The particles obtained by the process are more homogeneous, with the result that, when applied to the object which is to be coated, a uniform layer thickness of the coating is obtained, which shows an increased impact strength.

12 Claims, No Drawings

PROCESS FOR PREPARING HEAT-CURABLE, WATER-DILUTABLE COATING COMPOSITIONS FOR COATING METAL SUBSTRATES

The invention relates to a process for preparing compositions for coating objects or workpieces using electrolytic deposition methods.

From U.S. Pat. No. 3,869,366, it is known to prepare coating compositions for electrolytic deposition by the following steps, which are closely related to the preparation of powdered coating compositions:

1. Mixing the solid components of the powdered coating composition;
2. Extruding the mixture;
3. Cooling the extruded material;
4. Grinding the extruded material to form a powdered coating composition with a maximum particle size of 100 μm;
5. Addition of the ground powdered coating composition to a cationic binder; and
6. Addition of water to the coating composition to give the desired solids content for electrolytic application.

The coating compositions produced in this way consist of a cationic resin used as a binder and a powdered non-ionic resin, which are prepared in separate operations, and other additives, and before use these components are worked together to form the coating composition. With these coating compositions, coatings having a thickness of more than 30 μm can be obtained.

In the known process, a powdered coating composition is always produced first and, during production, in the extruder, this composition is generally subjected to temperatures of 100° to 130° C., for a length of time which depends on the extrusion parameters of temperature, time of stay in the extruder and friction. At these temperatures, a preliminary reaction generally occurs which causes an increase in the melting viscosity and hence poor flow qualities and inadequate wetting of substrates, and thus has a detrimental effect on film formation with the coating compositions during later processing. Moreover, there is a reduction in the mechanical strength of the coatings during dynamic deformation or expansion. The resistance to corrosive agents is also impaired. The disadvantages in film formation also have a detrimental effect when the coatings obtained by electrolytic application and chemical cross-linking are processed further, e.g. if the unevenness of the surface is to be reduced by sanding. Naturally, more sanding is required, the more uneven the surface, i.e. the poorer the flow of the coating composition. However, sanding is necessary to ensure that the decorative coatings subsequently applied have the best possible optical appearance.

The operating sequence described above, namely application, cross-linking, sanding and overpainting, is used in applying coating compositions to vehicles, particularly motor cars.

However, with the coating compositions known from U.S. Pat. No. 3,869,366, coating films are obtained which, in practice, cannot be considered for a wide range of applications, owing to the disadvantages described above, even though there is a considerable demand for such products.

This invention relates to the preparation of coating compositions which do not have the above-mentioned disadvantages but have better properties and are also easier to produce.

One advantage of the invention is that it eliminates the risk of a dust explosion occurring during metering and during long grinding periods. In the process according to the invention, the mixing of the components of the coating composition is effected in grinding apparatus. Admittedly, it has long been known to grind solid substances in grinding apparatus. In this particular case, however, using special components, preliminary reactions are ruled out, since, in contrast to the extruder process, which encourages preliminary reaction, no melting of the reaction components is required. Moreover, the cleaning of the apparatus used is made substantially easier, as there is no preliminary reaction which often causes material to adhere or cake onto the walls of the processing apparatus. Finally, the particles obtained are more homogeneous, with the result that, when applied to the object which is to be coated, a uniform layer thickness and a substantially constant drop in current intensity are obtained; these are characteristics which are also regarded as being advantageous in paint application by electrodeposition.

A further advantage is that certain technically complex and expensive steps can be eliminated. Finally, the coating compositions obtained by the process according to the invention differ from those prepared according to the prior art in that the composition of the coatings can be adjusted during production, without the need to repeat any complex steps.

The invention relates to a process for preparing heat-curable, water-dilutable coating compositions based on polymers and/or polycondensates, cationic synthetic resins, cross-linking agents and optionally pigments and/or conventional adjuvants, wherein (A) 5–35, preferably 10–25% by weight of at least one epoxy resin which is solid at ambient temperature, (B) 2–20, preferably 5–12% by weight of at least one ketone resin and/or hydrocarbon resin which is solid at ambient temperature, (C) 15–60, preferably 30–55% by weight of at least one cationic synthetic resin having functional groups, which is in the form of a solution or dispersion with a solids content of 10 to 50% by weight, (D) 5–30, preferably 15–25% by weight of at least one organic cross-linking agent which is solid at ambient temperature, and (E) 0–73, preferably 0–40% by weight of pigments and/or conventional adjuvants, in which the sum of components (A) to (E) is always 100% by weight, are processed together, in one or more stages in a grinding apparatus, at least one stage being a wet operation, the original particle size being reduced so as to form a homogenous coating composition having a particle size of less than 100 μm and subsequently water is added to adjust the solids content to that required for application.

The process according to the invention may be carried out continuously or discontinuously. The solid starting materials are ground with the other components in suitable apparatus. Generally, ground pastes of this kind have solids contents of up to 50% by weight. The concentration of the material to be ground in the wet grinding operation may be even higher, i.e. up to 80% by weight or lower, i.e. down to 25% by weight; it depends on the viscosity of the material, which in turn depends on the hydrophilic or hydrophobic characteristics of the components present. In any case, however, the material should remain pumpable. The coating mixture obtained is then mixed with water to give the desired solids content, unless this has already been achieved.

At the end of the grinding operation, the particle size of the solid components of the composition should be not more than 15, more particularly not more than 5 μm.

Examples of suitable grinding apparatus for use in the process according to the invention include oscillatory mills, impact mills, pinned disc mills, hammer mills, air jet mills, planetary ball mills and sifting mills and stirrer-type ball mills such as sand or bead mills and colloid mills, which may operate individually or in series, whilst it is also possible to combine different types of mill. Thus, for example, in a first stage the components may be coarsely ground in the dry state and then be subjected to wet grinding. The two stages may also be combined to form a single grinding operation in one apparatus, in which the dry materials are fed in at the start of a grinding tube and the liquid components are then added in the centre.

Preferably, water is used as the liquid phase in the wet operation.

The epoxy resin (A) of the coating composition is solid at ambient temperature, but melts and flows at the cross-linking temperature and thus forms a layer and imparts corrosion resistance and impact strength to the coating. Examples of materials which may be used include polymers containing epoxide groups based on diphenylolpropane (bisphenol A) and/or diphenylolmethane (bisphenol F) and epihalohydrin and/or methylepihalohydrin, preferably epichlorohydrin, and which may be prepared by the one-step or two-step processes described in the literature (cf. for exmple Epoxydverbindungen und Epoxydharze (epoxy compounds and epoxy resins), Paquin (1958), p. 322ff), e.g. those having a Durrans softening point (SP) of at least 70° C. and an epoxy equivalent weight (EE) of at least 490; SP 93°–104° C. and EE 875 to 1000 and SP 118° C. and EE 1865. Component (A) is generally used in amounts of 5 to 35, preferably 10 to 25% by weight. These quantities, and those given hereinafter, relate in each case to 100% by weight of components (A)–(E).

The resins of component (B) are hydrophobic polymeric substances without any functional groups, which promote the flow of the coating composition, its cross-linking with the substrate and the wetting of the pigment. For example, ketone resins and hydrocarbon resins may be used, such as dicyclopentadiene resins and hydrocarbon resins from the $C_5$ or $C_9$ fractions of petroleum fractionation, but preferably cumarone or cumarone-indene resins.

Component (C) acts as a carrier resin in the coating mixture for the electrolytic coating. It is a thermosetting resin containing functional groups and having an inter- and/or intramolecular cross-linking activity, so as to form the binder for all the components contained in the coating composition. This resin is used as an aqueous solution or dispersion, e.g. in amounts of from 15 to 60, preferably 30 to 55% by weight (solids). The aqueous solutions or dispersions of the resins used preferably have a solids content of from 21 to 38% by weight and contain, as solvent, water and/or at least one water-soluble alcohol, for example methanol, ethanol, n- or iso-propanol. Owing to its cationic nature, the carrier resin conveys all the substances of the coating composition used to the metal substrate which is to be coated. These carrier resins are generally water-soluble or are present in a form which can be diluted with water, and include, for example: epoxy resins with amino groups added (aminoepoxy resins), acrylates containing amino groups (amino acrylic resins), copolymers of vinyl compounds containing amino groups (amino vinyl resins), amine resins (such as melamine and urea resins) and polyamide resins and mixtures thereof. The aminoepoxy resins are preferred.

The resins mentioned in U.S. Pat. No. 3,869,366, which correspond to components (A) and (C), can generally be used in the process according to the invention.

Suitable products for use as the cross-linking component (D) include, for example, masked polyisocyantes, preferably of an aliphatic nature. Examples of these polyisocyanates are hexamethylene diisocyanate, methylene-bis-cyclohexyl diisocyanate and a triisocyanate prepared by reacting hexamethylene diisocyanate and water. Suitable products include, for example, those masked with acetoacetic acid esters, for example of methanol, ethanol, the various propanols or butanols, or those masked with ε-caprolactam. Other compounds which may be used include imidazole and 2-imidazoline and the derivatives thereof, dicyanodiamide, substituted biguanides, and amine resins such as melamine and urea resins. These compounds (D) are added to the mixture either alone or in admixture.

In the process according to the invention, pigments and conventional adjuvants (E) may be added to the coating composition.

The pigmenting is conveniently effected using inorganic and/or organic pigments, for example titanium dioxide and carbon black, the proportion generally not exceeding 50% by weight, preferably not exceeding 29% by weight. Carbon black is generally used in amounts of not more than 7, preferably not more than 1% by weight.

Furthermore, finely divided silicon dioxide may be added as a extender in amounts of up to 18% by weight, preferably 10% by weight.

Examples of flow agents and wetting agents which may be used include silicone oils and resins, polyacrylates such as poly-n-butyl acrylate or poly-2-ethylhexyl acrylate and cellulose acetobutyrate. These adjuvants are generally added in amounts of up to 5, preferably up to 1% by weight.

The coating compositions obtained using the process according to the invention are highly suitable for electrolytic coating of metal substrates in an aqueous bath, in which the substrate forms the cathode.

The deposition process is known as so-called cataphoretic deposition or the EPC process (electrophoretic powder coating).

The solids content of the aqueous bath is generally from 1 to 30% by weight, preferably 10 to 15% by weight based on the total composition. The pH of the bath may be 7 or less and is preferably from 4 to 7.

During the electrolytic deposition process, the bath is appropriately maintained at 20° to 35° C. A voltage is applied betwen the cathode (the workpiece to be coated) and the anode, so that a direct current flows through the bath. The voltage to be applied is generally 20 to 600 V, preferably 50 to 400 V.

The electrolytic deposition is continued until a film of the desired thickness has been deposited on the workpiece acting as the cathode. Generally, the deposition time is from 10 to 60, preferably 20 to 40 seconds. With the coating composition prepared according to the invention, it is also possible to deposit thicker films (i.e. thicker than may be obtained with conventional electrolytic deposition processes) on the workpiece. Preferably, the thickness is from 30 to 100 μm, more particularly 40 to 60 μm, but film thicknesses of up to about 200 μm or more can also be obtained.

After the electrolytic deposition, the resin-coated workpiece is taken out of the bath, rinsed with water and then heated or stoved in the usual way, whereupon the layer of resin melts and/or is cured and a film is formed. Preferably, the coated workpiece is pre-heated to a temperature of 50° to 100° C. for a period of up to about 10 minutes and then stoved at a temperature of from 150° to 250° C. for 15 to 30 minutes.

During the cathodic deposition process, the solid constituents of the coating composition are precpitated out of the bath. It is therefore necessary to add these substances to the bath again in order to maintain a corresponding bath concentration. The substances may be added continuously or discontinuously, during stoppage of the apparatus. Care must be taken to ensure that the initial conditions are re-established as far as possible.

The invention is illustrated by the following non-limiting Examples, in which T represents parts by weight and % refer to % by volume, unless otherwise stated.

EXAMPLE 1

141 T of the urethane-modified cationic aminoepoxy resin according to Example 8 of U.S. Pat. No. 3,869,366 having a solids content of 30% by weight, adjusted by means of deionised water; 1 T of polymethylsiloxane; 14 T of an epoxy resin obtained from 4,4'-diphenylolpropane and epichlorohydrin (softening point (SP) according to Durrans 93° to 104° C., epoxy equivalent weight (EE) 875 to 1000, viscosity 430 to 630 mPa.s in 40% solution, measured in ethyleneglycol dibutyl ether at 25° C.); 8 T of a cumarone resin (SP 111° to 130° C., and an acid number of less than 1); 20 T of methylene-bis-cyclohexyl-diisocyanate with an NCO content of 13% by weight, masked with ε-caprolactam (these solid compounds have a particle size of about 1 mm); 13 T of standard commercial titanium dioxide; 0.4 T of finely divided carbon black; and 0.2 T of finely divided silicon dioxide with a purity of more than 99.8% by weight, a BET surface of 300±30 and an average primary particle size of 7 nanometers; are fed into a stirrer-type ball mill. The mill is fitted with quartzite grinding members measuring from 0.5 to 3 mm. At a circumferential speed of 12 m/s, the coating composition is comminuted to a maximum particle size of 10 to 15 μm in 30 minutes. Then 548 T of deionised water are added, whilst the grinding members used are simultaneously removed. Yield 746 T.

EXAMPLE 2

Example 1 is repeated, except that the starting resins and hardeners are put in as coarse materials with a maximum particle size of 10 mm and, instead of the cumarone resin, an equal amount of a ketone resin, that is a standard commercial cyclohexanone resin, is used (softening point according to DIN 53 180: 75°-85° C., viscosity at 23° C. according to DIN 53 211, 50% in xylene: 15 seconds; acid number $\leq 1$). The grinding apparatus used here is an oscillatory mill, the oscillating means of which consist of two grinding tubes connected to each other by webs, containing steel bars 20 mm in diameter. Thus, continuous operation is possible. After the grinding process, deionised water is added to give the desired solids content. The solids particles have a maximum particle size of 12 μm.

COMPARISON EXAMPLE (according to Example 8 of U.S. Pat. No. 3,869,366)

350 T of an epoxy resin obtained from 4,4'-diphenylolpropane and epichlorohydrin (SP 93° to 104° C. [Durrans]; EE 875 to 1000), 150 T of an epoxy resin obtained from the same components (SP 118° C., EE 1865) and 40 T of a standard commercial polyamide resin, prepared from hexamethylenediamine and adipic acid, are mixed together and melted and kneaded in an extrusion press in the usual way. After coarse grinding, 50 T of iron oxide pigment and 20 T of dicyanodiamide are added and the mixture is ground to form a powder with a particle size of 40 μm. 137 T of the standard commercial urethane-modified amino epoxy resin mentioned in the said U.S. Patent, diluted with deionised water to give a solids content of 30% by weight, are mixed with 450 T of water and 1 T of glacial acetic acid and then 200 T of the powder described above are dispersed therein.

EXAMPLE 3

The compositions according to Examples 1 and 2 and according to the comparison Example were each diluted with deionised water to a solids content of 15% by weight, then adjusted to a pH of 5 using acetic acid and electrolytic coating was carried out in known manner using these baths.

A steel sheet to be coated (Bonder 130, treated with zinc phosphate) was immersed in the bath to act as cathode. An anode consisting of stainless steel was also placed in the bath.

Electrolytic deposition was carried out in the usual way, with vigorous agitation of the liquid, at 25° C. for 25 seconds. The distance between the electrodes was 15 cm and the voltage applied was 200 V. The electrolytically coated sheet, the coating on which was 50 μm thick, was taken out of the bath, rinsed with water, preheated to 70° C. for 10 minutes to dry it and then stoved at 180° C. for 20 minutes.

The metal sheets obtained were tested, and the results obtained are shown in the following Table.

The sharp increase in impact strength is particularly striking. However, the other test results also show a significant improvement in the properties of the coatings obtained with the coating compositions prepared according to the invention.

TABLE

| | Example | | |
|---|---|---|---|
| | 1 | 2 | Comparison |
| Impact strength ASTM D 2794 (reverse, inch pound) | 160 | 140 | 5 |
| Surface unevenness (evaluated according to DIN 53 230) | 1 | 1.5 | 4 |
| Grinding work (evaluated according to DIN 53 230) | 2 | 2 | 4 |
| Sedimentation of the solids in the coating composition ready for processing (evaluated according to DIN 53 230) | 1 | 1 | 4 |
| Erichsen cupping (DIN 53 156) [mm] | 9 | 9 | 4 |
| Covering of the edge of the sheet with coating | 2 | 2 | 3 |

TABLE-continued

| | Example | | |
|---|---|---|---|
| | 1 | 2 | Comparison |
| composition (evaluated according to DIN 53 230) | | | |

0 = best value, 5 = worst value

What is claimed is:

1. A process for preparing heat-curable, water-dilutable coating compositions based on polymers, cross-linking agents and optionally conventional adjuvants, wherein
   (A) 5–35% by weight of at least one epoxy resin which is free from cationic groups, solid at ambient temperature and is liquid at the cross-linking temperature,
   (B) 2–20% by weight of at least one hydrophobic resin which is solid at ambient temperature and selected from the group consisting of ketone resin and hydrocarbon resin which is a dicyclopentadiene resin or a hydrocarbon resin derived from the $C_5$- or $C_9$-fractions of the petroleum fractionation,
   (C) 15–60% by weight of at least one cationic thermosetting synthetic resin having functional groups, which is in the form of a solution or dispersion with a solids content of 10 to 50% by weight,
   (D) 5–30% by weight of at least one nitrogen-containing organic crosslinking agent which is solid at ambient temperature and
   (E) 0–73% by weight of at least one component selected from the group consisting of pigments and other conventional adjuvants,
   in which the sum of components (A) to (E) is always 100% by weight, are processed together, in one or more stages in a grinding apparatus, at least one stage being a wet grinding operation, the original particle size being reduced so far to form a homogeneous coating composition having a particle size of less than 100 μm and subsequently water is added to adjust the solids content to that required for application.

2. A process as claimed in claim 1 wherein a resin, selected from the group consisting of cumarone resin and cumaroneindene resin is used as component (B).

3. A process as claimed in claim 1 wherein the particles are obtained having a particle size of not more than 15 μm.

4. A process as claimed in claim 1 wherein particles are obtained having a particle size of not more than 5 μm.

5. A process as claimed in claim 1 wherein the grinding process is carried out continuously.

6. A process as claimed in claim 1 wherein the wet grinding operation is carried out in the presence of water.

7. A process as claimed in claim 1 wherein the homogeneous coating composition is adjusted to a solids content of from 1 to 30% by weight based on the total composition.

8. A coating composition prepared according to the process as claimed in claim 1 for the electrolytic coating of a metal substrate in an aqueous bath.

9. A process for preparing heat-curable, water-dilutable coating compositions based on polymers, cross-linking agents and optionally conventional adjuvants, wherein
   (A) 10–25% by weight of at least one epoxy resin which is free from cationic groups, solid at ambient temperature and is liquid at the cross-linking temperature,
   (B) 5–12% by weight of at least one hydrophobic resin which is solid at ambient temperature and selected from the group consisting of ketone resin and hydrocarbon resin which is a dicyclopentadiene resin or a hydrocarbon resin derived from the $C_5$- or $C_9$-fractions of the petroleum fractionation,
   (C) 30–55% by weight of at least one cationic thermosetting synthetic resin having functional groups, which is in the form of a solution or dispersion with a solids content of 10 to 50% by weight,
   (D) 15–25% by weight of at least one nitrogen-containing organic crosslinking agent which is solid at ambient temperature and
   (E) 0–40% by weight of at least one component selected from the group consisting of pigments and other conventional adjuvants,
   in which the sum of components (A) to (E) is always 100% by weight, are processed together, in one or more stages in a grinding apparatus, at least one stage being a wet grinding operation, the original particle size being reduced so far to form a homogeneous coating composition having a particle size of less than 15 μm and subsequently water is added to adjust the solids content to that required for application.

10. A process as claimed in claim 9 wherein component (C) comprises an amino epoxy resin.

11. A process as claimed in claim 1, wherein component (D) comprises a masked polyisocyanate.

12. A process as claimed in claim 1, wherein the proportion of pigment does not exceed 29% by weight.

* * * * *